Nov. 23, 1926.  
G. L. PRICHARD ET AL  
1,607,966  
PROCESS OF CONVERTING OILS  
Filed May 6, 1922
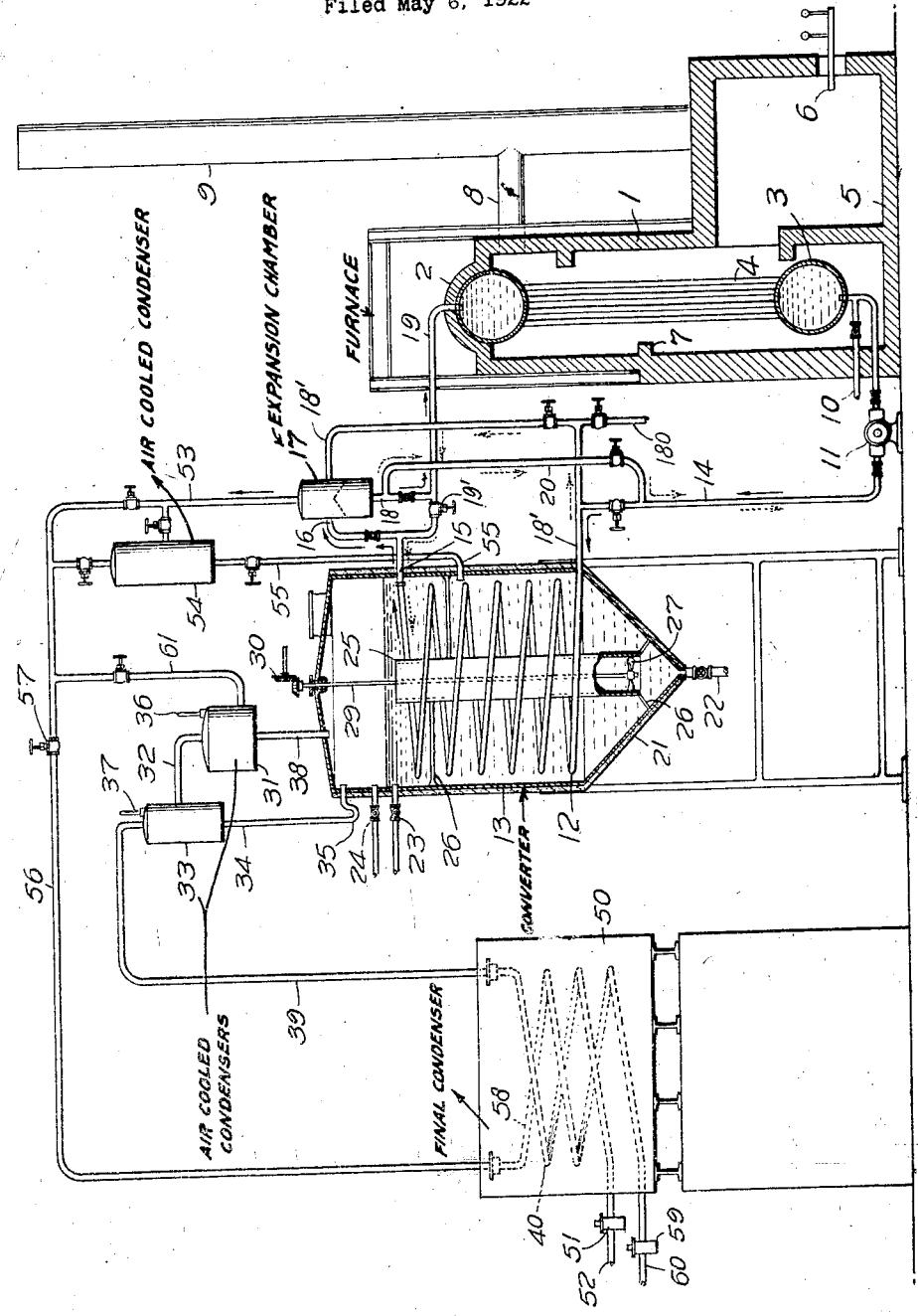
INVENTORS  
GEORGE L. PRICHARD, AND  
HERBERT HENDERSON  
BY K. P. McElroy  
their ATTORNEY Patented Nov. 23, 1926.

1,607,966

UNITED STATES PATENT OFFICE.

GEORGE L. PRICHARD AND HERBERT HENDERSON, OF PORT ARTHUR, TEXAS, ASSIGNORS TO GULF REFINING COMPANY, OF PITTSBURGH, PENNSYLVANIA, A CORPORATION OF TEXAS.

PROCESS OF CONVERTING OILS.

Application filed May 6, 1922. Serial No. 559,888.

This invention relates to converting oils with aluminum chlorid; and it comprises a method of heating high boiling oils with aluminum chlorid for the production of vapors of lower boiling oils wherein the heat necessary for maintaining the temperature of the system and for producing such vapors is furnished by circulating fluids in heat-transferring relationship thereto; all as more fully hereinafter set forth and as claimed.

As is now known, it is feasible to utilize the catalytic powers of anhydrous aluminum chlorid in the conversion of high boiling petroleum oils into lower boiling oils; as in manufacturing gasoline from gas oil, etc. In the ordinary or cracking distillation of a gas oil having a boiling point of, say 600° F., the temperature steadily rises with production of gas and coke and a comparatively small yield of unsaturated, low grade gasoline and kerosene. By admixing such a gas oil however with anhydrous aluminum chlorid in small amount, say, 5 per cent, and heating, free ebullition takes place at about 475° and rises but slowly to 500-550°; the ebullition producing large yields of the vapors of clean, saturated gasoline, or of gasoline and kerosene, as the case may be. The distillate may be gasoline with an end boiling point of say, 300° F.; a boiling point much below the temperature at which the gasoline is formed.

The aluminum chlorid is not indefinitely soluble in the oil. On addition of a small amount of chlorid, say, the 5 per cent mentioned, to hot oil, it unites or melts down with a portion to form a heavy oily liquid tending to underlie the rest of the oil. In practice, in order to get large area contact between the two liquids and for other reasons, vigorous agitation is employed; the effort being to keep the aluminum chlorid in suspension or emulsified as much as may be. As the catalyzing action goes on, the oily liquid gradually loses its original high activity and becomes thicker in consistency. In the end, it may become asphaltic or even coky. At such a time as the judgment of the operator may deem expedient, the spent aluminum chlorid is allowed to settle out and is removed and sent to a recovery plant to regain aluminum chlorid in its original highly active form.

Looked at in one way, the operation is that of vaporization of the oil (as gasoline) and in volatilizing actions the consumption of heat is considerable. The necessity for large amounts of heat is increased by the common practice of using air cooled reflux condensers to condense and return vapors of aluminum chlorid, etc. All the heat dissipated by the air cooled reflux condensers must be again supplied to the system. Ordinarily, the stills in which the operation is performed are heated in the usual way, at their bases; the still being set in some sort of furnace chamber. This brings several mechanical difficulties with it. For one thing, the heavy aluminum chlorid compound tends to settle to the bottom and bake on the heating elements with a rapid loss in activity. Also, the baked-on layer acts, more or less, to slow the transmission of heat. For this reason and also because of the relatively great amount of heat which must be furnished through a relatively small area of metal, the still walls are necessarily kept at a temperature much above that which is necessary to maintain the reaction. In the stated example, the bath of gas oil and aluminum chlorid may not at any time reach a heat above say 550° F. but the heated walls of the still must be kept much above this temperature; being, so to speak, superheated. The net result is a waste of heat and unduly early deterioration of some or much of the aluminum chlorid. That chlorid which comes into contact with, or bakes on the walls, is apt to be subjected to temperatures very much above the reaction temperature of 500-550°. The oil in contact with the walls is also more or less cracked; a result not here desired.

In the present invention, we obviate the noted difficulties and secure a number of new advantages by the expedient of delivering heat to the system at a temperature not much above that required for the reaction and production of free ebullition. We maintain a heating surface of large area at a relatively low temperature instead of a small surface at a high temperature and thereby secure a longer period of activity for our aluminum chlorid. In so doing, we place within the body of oil and aluminum chlorid a coil system and through the coil system we send a rapid current of heating fluid (oil or oil vapor) usually at a temperature only a few degrees above that necessary for reaction with the particular oil under distillation; the excess in temperature being merely that necessary to give good heat transmission through the metal wall of the tubing. In so doing, there is no opportunity for either the aluminum chlorid or the oil to become over-heated; and a given charge of aluminum chlorid is much more long lived, with a consequent cheapening in the whole operation; anhydrous aluminum chlorid being a relatively expensive chemical.

In the accompanying drawings we have shown more or less diagrammatically, one form of apparatus useful in the performance of our process.

The view is in longitudinal section, a part being in elevation.

Referring to the drawings 1 indicates a furnace in which is mounted a tubular heater comprising an upper drum 2 and lower drum 3 connected by the tubes 4. The furnace is provided with the fire box 5 and oil or gas burner 6. The baffle 7 causes circulation of fire gases around the tubes 4 to the flue 8 leading to the stack 9. The heater system may be charged with any oil. Gas oil or solar oil will serve if the heating is to be done by circulation of oil through the coils. Either can be heated to the temperature necessary to cause reaction in the bath of oil and aluminum chlorid. Other high boiling oils may be used. If heating is to be done by oil vapor, lower boiling oils are desirable or the temperature of the pipes 4 should be high enough to cause cracking and production of gases and vapors from the oil. The oil heated in this preliminary heater may be admitted to the lower drum through valve inlet 10 and may be circulated by means of the pump 11 through the coil 12 located in the converter or reaction chamber 13; the oil in this case circulating downwardly through the heating elements and upwardly through the coils in the converter. The circulation of the hot oil may be either from the lower drum 3 upwardly as shown by the full line arrows to the bottom of the coil 12 as just described or it may be in the opposite direction as is shown by the dotted arrows from the upper drum 2 to the top of the coil 12, the valves on the lines being adjusted in accordance with the circulation desired. Assuming the circulation is upward in the coil 12 in the converter 13, the oil passes from pump 11 by line 14 through the coil and thence out by lines 15 and 16 to the expansion chamber 17, liquid oil being returned through line 18 and line 19 to the upper drum 2. Any vapors, as of cracked products, given off by the oil in heating, are released in this expansion chamber. If the circulation is in the opposite direction, the oil leaves drum 2 through valved line 19, the valves on lines 16 and 18 being closed and the valve 19' on the line 19 opened, and enters the coil 12 at the upper part through line 15, leaving the coil through line 18' and going to the expansion chamber 17. Liquid oil from the expansion chamber passes by line 20 to the line 14 by means of pump 11 and back to the lower drum 3, the valves on these lines being suitably regulated. If vapor heating is desired this may be secured by charging the heater system either with low boiling oil, such as naphtha, or with a high boiling oil, the heat maintained around tubes 4 being then great enough to produce cracking or destructive distillation. In either event, vapors (or vapors and gas) leave by the heater pipe 19 and pass through coil 12 in a downward direction, condensate being withdrawn by valved pipe 180 and sent to a suitable place of disposition (not shown). Uncondensed vapors and gases pass upward through 18' to the chamber 17. If more vapor or vapor and gas is being produced than required in the heating coil, the excess may pass through pipe 16 into the releasing chamber 17.

The converter is provided with a conical shaped bottom 21 having the valved draw off 22 for aluminum chlorid sludge and is further provided with inlets 23 and 24 for high boiling oil to be converted into lower boiling oils and for aluminum chlorid. The latter may be introduced in the form of a mixture of aluminum chlorid and oil. The converter is further provided with interior sleeve 25 mounted on the spider arms 26 and having the propeller 27 at the bottom thereof operated by the shaft 29 and the pinion 30 leading to a motor (not shown). The propeller operates to circulate the contents of the converter upwardly in the sleeve and downwardly between the sleeve and the interior walls of the converter. The converter is equipped with the preliminary air cooled condenser 31 having vapor line 32 leading to a second air cooled condenser 33, such second air cooled condenser being provided with a back trap line 34 having a seal 35. The first air cooled condenser 31 may be provided with a thermometer 36 and the second air cooled condenser may be provided with thermometer 37 for observation of temperature. Usually the process is run in such a way that the vapors going to exit at the top of the second air cooled condenser 33 do not leave the system at more than 350° F. Aluminum chlorid, or aluminum chlorid compounds, and heavy oils condensed in the reflux condensers leave 33 through 34 for return to the converter. Condensate from 31 returns to the converter through 38. Vapors leave the second condenser by vapor line 39 and go to the final condenser coil 40 in the condenser box 50 from which they pass the gas trap 51 and go to the stock tank (not shown) by line 52.

Referring to the expansion chamber 17 which serves for the separation of liquid oil from vapors or vapors and gases, the oil can flow back to either drum 2 or 3 in accordance with the circulation established, while vapors may pass by line 53 to an air cooled condenser 54. Condensates therefrom may be sent into the converter line 55, if desired, the valves being regulated accordingly. Where oil is introduced into the converter from this source, the supply of oil at 10 may be correspondingly increased. The vapors from condenser 54 or the vapors directly taken from expansion chamber 17, depending upon the operation selected, may pass through line 56, valve 57 thereon being opened, to the condensing coil 58 located in the condenser box 50, the condensate flowing past gas trap 59 by line 60 to a stock tank (not shown). The valve 57 on this line 56 may, however, be closed and the valve on line 61 may be opened, in which event the vapors from the heating line may be sent to the air cooled condenser 31 which is receiving vapors of higher boiling oil and aluminum chlorid from the converter. Since aluminum chlorid preferentially combines with unsaturated hydrocarbons and since these vapors if obtained by cracking may contain unsaturated bodies, aluminum chlorid will take up the unsaturated bodies and return with them to the converter. In so doing the amount of saturated gasoline vapors passing forward through 32 and 39 may be somewhat increased. Any uncondensed vapors of light saturated gasoline not condensed in 31 go forward through 32, etc., with the similar vapors coming from the converter.

The process may be operated without sending the vapors from the expansion chamber 17 or the air cooled condenser 54 to the air cooled condenser 31, these vapors going directly to the second coil 58 in the condenser box.

As is obvious from the description, the described apparatus may be used in a number of different ways. If a gas oil or solar oil or other heavy oil stable at about 600° F. is employed, heating may be wholly by the sensible heat of the oil which then passes through coil 12 in cyclic flow. Expansion chamber 17 then delivers very little vapor to 53. With any of these oils however, the temperatures in the tubular heater may be raised considerably; enough to form a substantial volume of cracked vapors. The light products are then taken care of in expansion chamber 17. The vapors may go directly to condensation through line 56; or they may be partially fractionated in air cooled condenser 54 with return of heavy condensate to the converter. The system may obviously be run so as to give a considerable proportion of these cracked products. The cracked products, which usually contain vapors of both saturated or unsaturated low boiling or light oils, may be passed through 61 to 31, which always contains aluminum chlorid volatilized from the converter. The aluminum chlorid removes or saturates the unsaturated vapors.

At any given stage in the operation the temperature of the bath of aluminum chlorid and oil is set and maintained, the consumption of heat by increased ebullition tending to repress any tendency to a rise in temperature. And it is the object of the present invention to provide means for delivering a large amount of heat to the bath at about this temperature without any risk of local overheating. The reaction temperature is generally somewhere between 500° and 550° F.; and in the present invention the oil-bathed surfaces of the heating elements can be easily maintained at or about this temperature with delivery of the required large volume of heat. The temperature required in the fluids circulating through the heating elements to produce this temperature of course varies with the speed of circulation, the thickness of the metal wall, but in general is only a few degrees above. With large areas of heating surface at bath temperatures, or but little above, the energetic agitation often employed is not so requisite, or may indeed become unnecessary.

What we claim is:—

1. The process of converting higher boiling petroleum oils into lower boiling oils which comprises establishing and maintaining a body of such higher boiling oil and aluminum chlorid, passing heated fluid in heat transferring relationship but without contact therewith in said body at a temperature sufficient to cause boiling thereof, and condensing and collecting lower boiling oil formed.

2. The process of converting higher boiling petroleum oils into lower boiling oils which comprises establishing and maintaining a body of such higher boiling oil and aluminum chlorid, passing heated oil in heat transferring relationship but without contact therewith in said body at a temperature sufficient to cause boiling thereof, and condensing and collecting lower boiling oil formed.

3. The process of converting higher boiling petroleum oils into lower boiling oils which comprises establishing and maintaining a body of such higher boiling oil and aluminum chlorid, passing oil heated to a temperature sufficient to produce vapors from such heated oil in heat transferring relationship but without contact therewith in said body at a temperature sufficient to cause a boiling thereof, condensing and collecting lower boiling oil formed from said body, separating and condensing the vapors of said heating oil and returning the condensate thereof to the said body undergoing treatment.

4. The process of converting higher boiling petroleum oils into lower boiling oils which comprises establishing and maintaining a body of such higher boiling oil and aluminum chlorid, passing heated oil in heat transferring relationship but without contact therewith in said body at a temperature sufficient to cause boiling thereof, condensing and collecting lower boiling oil formed, allowing a portion of the heating oil to flash into vapors out of contact with the body of oil after said heating oil has passed through the heat transfer stage, and separating and condensing such vapors.

5. The process of converting higher boiling petroleum oils into lower boiling oils which comprises establishing and maintaining a body of such higher boiling oil and aluminum chlorid, passing heated oil in heat transferring relationship but without contact therewith in said body at a temperature sufficient to cause boiling thereof, condensing and collecting lower boiling oil formed, allowing a portion of the heating oil to flash into vapors out of contact with the body of oil after said heating oil has passed through the heat transfer stage, separating and condensing such vapors and returning the condensate thereof to the said body undergoing treatment.

6. The process of converting higher boiling petroleum oils into lower boiling oils which comprises establishing and maintaining a body of such higher boiling oil and aluminum chlorid, passing heated oil in heat transferring relationship but without contact therewith in said body at a temperature sufficient to cause boiling thereof and production of vapors of lower boiling oil, allowing a portion of the heating oil to flash into vapors out of contact with the body of oil after said heating oil has passed through the heat transfer stage, separating and then mixing such vapors with vapors of the low boiling oil from the said body undergoing treatment and condensing the mixed vapors.

7. The process of converting higher boiling petroleum oils into lower boiling oils which comprises establishing and maintaining a body of such higher boiling oil and aluminum chlorid, passing heated oil in heat transferring relationship but without contact therewith in said body at a temperature sufficient to cause boiling thereof, condensing and collecting lower boiling oil formed, allowing a portion of the heating oil to flash into vapors out of contact with the body of oil after said heating oil has passed through the heat transfer stage, separating and condensing such vapors, and supplying fresh oil to the heating system to replace the oil vaporized.

8. The process of converting higher boiling petroleum oils into lower boiling oils which comprises establishing and maintaining a body of such higher boiling oil and aluminum chlorid, passing heated oil in heat transferring relationship but without contact therewith in said body at a temperature sufficient to cause boiling thereof and production of vapors of lower boiling oil, condensing and collecting the lower boiling oil formed, allowing a portion of the heating oil to flash into vapors after said oil has passed through the heat transfer stage, partially condensing these vapors, sending the condensate to the main body of oil undergoing treatment and separately condensing the remaining vapors.

9. The process of converting higher boiling petroleum oils into lower boiling oils which comprises establishing and maintaining a body of such higher boiling oil and aluminum chlorid, passing heated oil in heat transferring relationship but without contact therewith in said body at a temperature sufficient to cause boiling thereof and production of vapors of lower boiling oil, condensing and collecting the lower boiling oil formed, allowing a portion of the heating oil to flash into vapors after said oil has passed through the heat transfer stage, partially condensing these vapors, sending the condensate of the partially condensed vapors to the main body of oil undergoing treatment and condensing the remaining vapors of said heating oil with the lower boiling oil vapors formed from said body.

10. The process of converting higher boiling petroleum oils into lower boiling oils which comprises establishing and maintaining a body of such higher boiling oil and aluminum chlorid, passing oil heated to a cracking temperature in heat transferring relationship but without contact therewith in said body, maintaining said body at a temperature sufficient to cause boiling thereof by such passage of heated oil, condensing and collecting vapors of lower boiling oil formed from said body, separating the vapors formed in the heating of said oil to a cracking temperature and condensing such vapors.

11. The process of converting higher boiling petroleum oils into lower boiling oils which comprises establishing and maintaining a body of such higher boiling oil and aluminum chlorid, passing oil heated to a cracking temperature in heat transferring relationship but without contact therewith in said body, maintaining said body at a temperature sufficient to cause boiling thereof by such passage of heated oil, condensing and collecting lower boiling oil formed from said body, separating the vapors formed in the heating of said oil to a cracking temperature, condensing such vapors and continuously supplying fresh oil to the heating system to replace that removed as vapors.

12. The process of converting higher boiling petroleum oils into lower boiling oils which comprises establishing and maintaining a body of such higher boiling oil and aluminum chlorid, passing oil heated to a cracking temperature in heat transferring relationship but without contact therewith in said body, maintaining said body at a temperature sufficient to cause boiling thereof by such passage of heated oil, condensing and collecting lower boiling oil formed from said body, separating the vapors formed in the heating of said oil to a cracking temperature, partially condensing these vapors, sending the condensate to the main body undergoing treatment and separately condensing the remaining vapors.

13. The process of converting higher boiling petroleum oils into lower boiling oils which comprises establishing and maintaining a body of such higher boiling oil and aluminum chlorid, passing oil heated to a cracking temperature in heat transferring relationship but without contact therewith in said body, maintaining said body at a temperature sufficient to cause boiling thereof by such passage of heated oil, condensing and collecting vapors of lower boiling oil formed from said body, separating the vapors formed in the heating of said heating oil to a cracking temperature and mixing these vapors with vapors of the low boiling oils from the main body undergoing treatemnt and condensing vapors of the heating oil with the vapors of low boiling oil from said body.

14. The process of converting higher boiling petroleum oils into lower boiling oils which comprises establishing and maintaining a body of such higher boiling oil in admixture with aluminum chlorid, heating such body to a boiling temperature by passing heated oil in heat transfer relationship thereto but out of contact therewith, thus producing vapors of lower boiling oil and higher boiling oil in admixture with vaporized aluminum chlorid, permitting a part of the oil used for heating to flash into vapor after the said body has been heated by said oil, conducting the vapors so flashed to the mixture of vaporized oil and chlorid, cooling said mixture to condense the said vapors of higher boiling oil, aluminum chlorid, and a portion of the flashed vapors, conducting the resultant condensate to the body undergoing treatment, and condensing said vapors of lower boiling oil together with the remaining uncondensed portion of the flashed vapors.

15. The process of converting higher boiling petroleum oils into lower boiling oils which comprises establishing and maintaining a body of such higher boiling oil in admixture with aluminum chlorid, heating a separate mass of oil to cracking temperature and passing the same in heat transferring relationship to the first said body but out of contact therewith to heat said first body and produce vapors of lower boiling oil and the chlorid, conducting the said chlorid and said oil vapors to a condenser, condensing the chlorid and part of the vapors of the oil from said body therein and returning them to the first said body, passing vapors of the heating oil to the said condenser and admixing them with the vapors of the oil and the chlorid therein, and refluxing to the first said body condensed vapors from said heating oil and finally condensing remaining vapors not condensed in said condenser.

16. In the distillation of petroleum oils with aluminum chlorid the process which comprises establishing and maintaining a bath of oil and chlorid at the temperature of free ebullition and furnishing the heat units required by said ebullition by hot oil in heat-communicating relationship to said bath.

In testimony whereof, we have hereunto affixed our signatures, this 3rd day of May, 1922.

GEORGE L. PRICHARD.
HERBERT HENDERSON.